United States Patent
Zheng et al.

(10) Patent No.: US 12,443,610 B2
(45) Date of Patent: Oct. 14, 2025

(54) SYSTEMS AND METHODS FOR GENERATING TRENDING SEARCH QUERIES USING PREDICTIVE SEARCH ENGINES

(71) Applicant: Walmart Apollo, LLC, Bentonville, AR (US)

(72) Inventors: Junchao Zheng, Jersey City, NJ (US); Chen Song, Princeton, NJ (US); Jun Zhao, Jersey City, NJ (US); Zheng Yan, Short Hills, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 151 days.

(21) Appl. No.: 18/103,264

(22) Filed: Jan. 30, 2023

(65) Prior Publication Data

US 2024/0256555 A1   Aug. 1, 2024

(51) Int. Cl.
| | |
|---|---|
| *G06F 16/24* | (2019.01) |
| *G06F 16/2457* | (2019.01) |
| *G06F 16/9535* | (2019.01) |
| *G06F 16/9538* | (2019.01) |
| *G06Q 30/0601* | (2023.01) |

(52) U.S. Cl.
CPC .... *G06F 16/24578* (2019.01); *G06F 16/9535* (2019.01); *G06F 16/9538* (2019.01); *G06Q 30/0633* (2013.01)

(58) Field of Classification Search
CPC ................................................. G06F 16/24578
See application file for complete search history.

(56) References Cited

U.S. PATENT DOCUMENTS

| | | | |
|---|---|---|---|
| 9,449,052 B1* | 9/2016 | Rivard | G06F 16/245 |
| 10,078,696 B1* | 9/2018 | Sadler | G06F 16/951 |
| 10,360,227 B2 | 7/2019 | Garg et al. | |
| 10,459,964 B2 | 10/2019 | Mei et al. | |
| 11,288,319 B1* | 3/2022 | Das | G06F 40/186 |
| 11,507,876 B1 | 11/2022 | Kuo et al. | |
| 11,687,438 B1* | 6/2023 | Torbett | G06F 11/3428 |
| | | | 702/186 |
| 2016/0224633 A1* | 8/2016 | Rehman | G06F 16/219 |
| 2016/0232241 A1* | 8/2016 | Stoyanov | G06F 16/9535 |
| 2017/0200194 A1* | 7/2017 | Gupta | G06F 16/9535 |
| 2018/0032636 A1* | 2/2018 | Mullaney | G06N 5/022 |
| 2018/0267973 A1* | 9/2018 | Zhang | G06F 16/335 |
| 2019/0095478 A1* | 3/2019 | Tankersley | G06F 11/3006 |
| 2019/0378023 A1* | 12/2019 | Huang | G06N 5/04 |
| 2020/0026702 A1* | 1/2020 | Chaturvedi | G06F 16/287 |
| 2021/0224337 A1* | 7/2021 | Ballard | G06Q 30/0246 |
| 2022/0171813 A1* | 6/2022 | Sharifi | G06F 16/9535 |
| 2022/0237251 A1* | 7/2022 | Huang | G06F 16/9538 |

FOREIGN PATENT DOCUMENTS

JP        5341847 B2   11/2013

* cited by examiner

*Primary Examiner* — Mohammad S Rostami
(74) *Attorney, Agent, or Firm* — FOLEY & LARDNER LLP

(57) ABSTRACT

Systems and methods including one or more processors and one or more non-transitory storage devices storing computing instructions configured to run on the one or more processors and perform functions relating to detecting trending search queries that are popular in a short-term time period. User engagement metrics are derived from historical search engine data. A trending analysis function executes statistical analyses on the user engagement to identify the trending search queries. Other embodiments are disclosed herein.

20 Claims, 7 Drawing Sheets

300

- 401– Storage Module(s)
  - 330– Electronic Platform
    - 410– Database(s)
      - 310– Items
      - 390– Historical Search Data
        - 391– User Engagement Metrics
        - 392– Historical Seach Queries
    - 320– Search Engine
      - 350–Search Queries
        - 351– Trending Queries
        - 352– Typeahead Queries
        - 353 – Recent Search Queries
      - 380– Search Results
      - 370– Query Review Interface
      - 360– Trending Analysis Function
        - 361 –Query Trending Scores
        - 362 – Significance Scores
        - 363 – Significance Threshold
        - 364 – Order Placement Threshold
        - 365 – Metric Trending Scores
- 402– Processing Module(s)

FIG. 4

500 – Search Engine Interface

510 – Query Input Field

520 – Predicted Search Query 1

520 – Predicted Search Query 2

520 – Predicted Search Query 3

520 – Predicted Search Query N

530 – Trending Section

| 351 | 351 | 351 | 351 | >> |

SYSTEMS AND METHODS FOR GENERATING TRENDING SEARCH QUERIES USING PREDICTIVE SEARCH ENGINES

TECHNICAL FIELD

This disclosure relates generally to generating trending search queries using predictive search engines.

BACKGROUND

Many modern search engines provided on electronic platforms attempt to predict search queries that are desired by users, and present the predicted search queries on interfaces to users. Accurately predicting the search queries can significantly improve the user's experience on the electronic platform, and reduce the time the user spends searching for relevant search results.

One type of predicted search query relates to typeahead search queries. To generate typeahead search queries, the search engine may utilize a language prediction tool to provide suggestions to users as they enter a query. As a user enters each keystroke, the typeahead search feature can generate more accurate search queries predictions, and a listing of candidate search queries can be presented to the user for consideration. To identify the candidate search queries, the typeahead search feature may analyze the popularity of previously submitted search queries over the course of a previous year, or other extended time period.

The aforementioned prediction technique commonly fails to identify search queries that are popular or trending in the short-term. For example, when a new product is launched, a predicted typeahead search feature likely would fail to predict candidate search queries corresponding to the new product because the popularity of search queries in the long-term is limited, despite spiking in popularity within the recent week or month. Similarly, the aforementioned prediction technique also would fail to predict candidate search queries that are trending upward in popularity due to seasonality. For example, some candidate search queries may spike in popularly for a short-term period due to seasonal trends (e.g., in time frames associated with particular holidays or when students return to school). Because the aforementioned prediction technique largely relies on long-term popularity of search queries, candidate search queries corresponding to short-term seasonal trends would not be identified.

BRIEF DESCRIPTION OF THE DRAWINGS

To facilitate further description of the embodiments, the following drawings are provided in which:

FIG. 4 illustrates a representative block diagram of a portion of the system of FIG. 3, according to an embodiment;

FIG. 5 illustrates a representative block diagram of a user interface, according to an embodiment;

Figure 1:
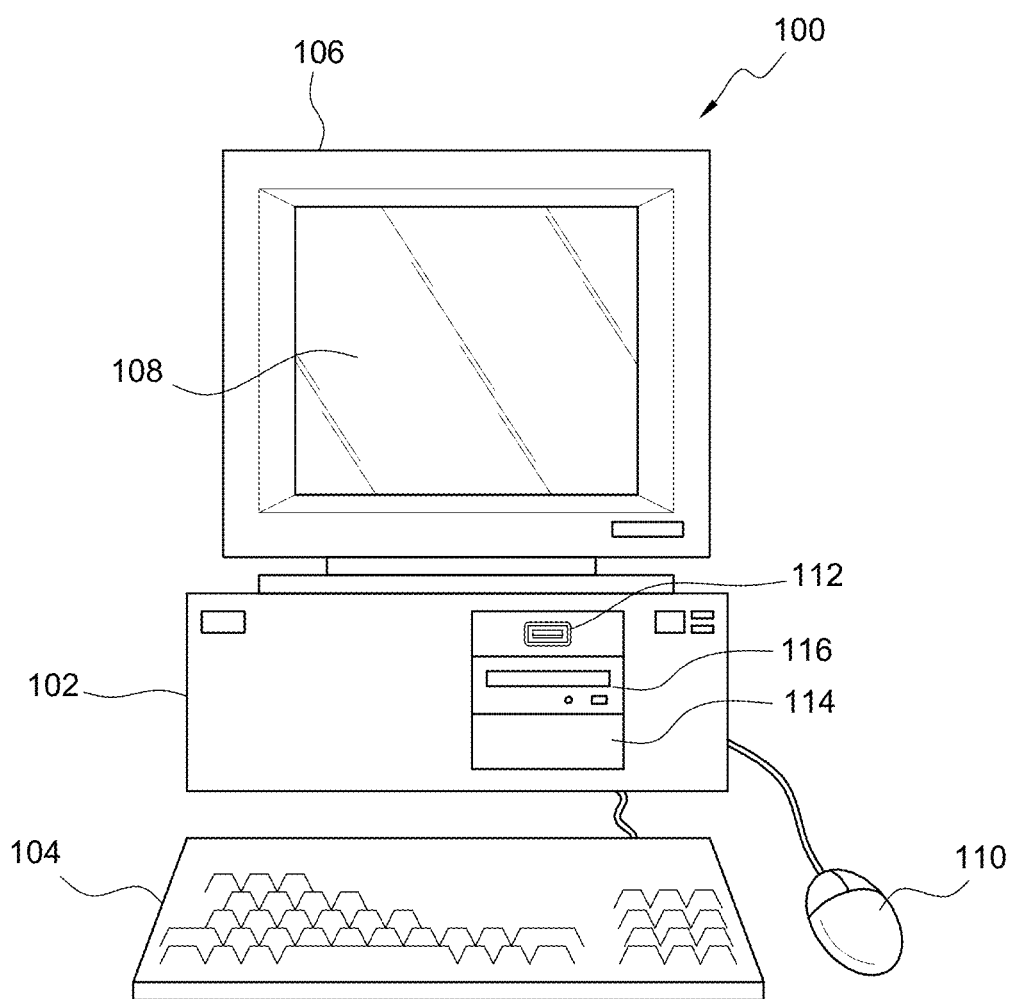
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be run on the one or more processors and perform functions comprising: receiving historical search queries submitted via a search engine an electronic platform; identifying trending search queries within the historical search queries, wherein identifying the trending search queries includes executing a trending analysis function on each historical search query that comprises: (i) generating a first set of user engagement metrics corresponding to a first historical time period for the historical search query; (ii) generating a second set of user engagement metrics corresponding to second historical time period for the historical search query; (iii) generating significance scores for the historical search query based, at least in part, on the first set of user engagement metrics and the second set of user engagement metrics; (iv) comparing each of the significance scores associated with the historical search query to a threshold; and (v) including the historical search query in the trending search queries based, at least in part, on a determination that each of the significance scores associated with the historical search query satisfy the threshold; and generating a search engine interface for the search engine that displays the trending search queries.

Various embodiments include a method. The method can be implemented via execution of computing instructions executed by one or more processors and configured to be stored on non-transitory computer-readable media. The method can comprise: receiving historical search queries submitted via a search engine an electronic platform; identifying trending search queries within the historical search queries, wherein identifying the trending search queries includes executing a trending analysis function on each historical search query that comprises: (i) generating a first set of user engagement metrics corresponding to a first historical time period for the historical search query; (ii) generating a second set of user engagement metrics corresponding to second historical time period for the historical search query; (iii) generating significance scores for the historical search query based, at least in part, on the first set of user engagement metrics and the second set of user engagement metrics; (iv) comparing each of the significance scores associated with the historical search query to a threshold; and (v) including the historical search query in the trending search queries based, at least in part, on a determination that each of the significance scores associated with the historical search query satisfy the threshold; and generating a search engine interface for the search engine that displays the trending search queries.

Figure 2:
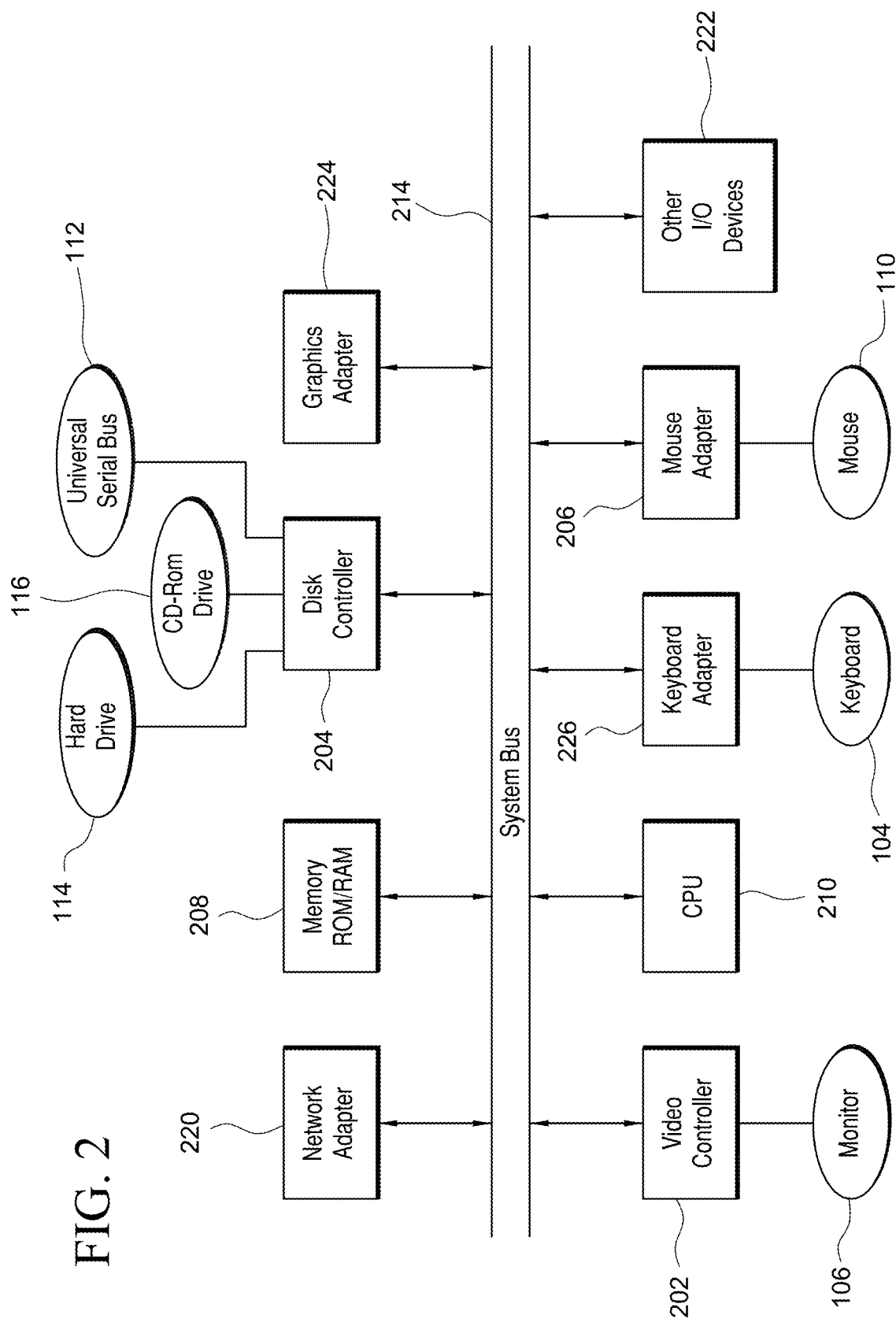
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
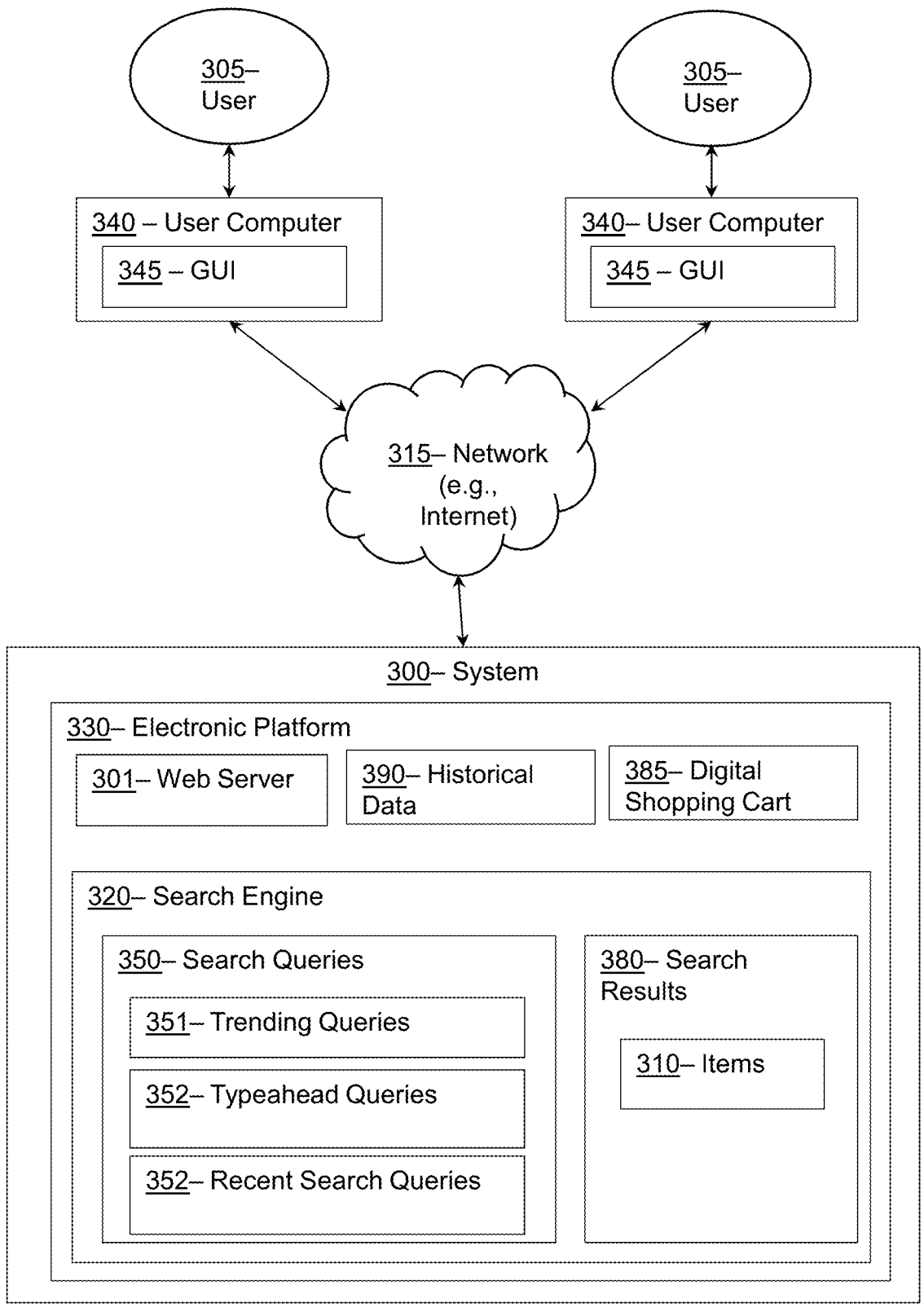
FIG. 3 illustrates a representative block diagram of a system, according to an embodiment.

Turning ahead in the drawings, FIG. 3 illustrates a block diagram of a system 300 that can be configured to identify and display trending search queries 351, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 301, a search engine 320 and an electronic platform 330. Web server 301, search engine 320, and electronic platform 330 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 301, search engine 320, and electronic platform 330. Additional details regarding web server 301, search engine 320, and electronic platform 330 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or one or more servers. In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, web server 301, search engine 320, and electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the web server 301, search engine 320, and/or electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the web server 301, search engine 320, and/or electronic platform 330. In a similar manner, the processing module(s) and the memory storage module(s) can be local and/or remote to each other.

In many embodiments, web server 301, search engine 320, and/or electronic platform 330 can be configured to communicate with one or more user computers 340. In some embodiments, user computers 340 also can be referred to as customer computers. In some embodiments, web server 301, search engine 320, and/or electronic platform 330 can communicate or interface (e.g., interact) with one or more customer computers (such as user computers 340) through a network 315 (e.g., the Internet). Network 315 can be an intranet that is not open to the public. Accordingly, in many embodiments, web server 301, search engine 320, and/or electronic platform 330 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 301, search engine 320, and/or electronic platform 330 also can be configured to communicate with one or more databases (e.g., database 410 in FIG. 4). The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 301, search engine 320, and/or electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to add items 310 to a digital shopping cart 385 and to purchase the added items 310. The items 310 made available via the electronic platform 330 may generally relate to any type of product and/or service including, but not limited to, products and/or services associated with groceries, household products, entertainment, furniture, apparel, kitchenware, electronics, fashion, appliances, sporting goods, etc.

Electronic platform 330 can include a search engine 320 that assists users 305 with identifying items 310. The search engine 320 may generally represent any application, program, and/or feature that is configured to search for items 310 included in database and/or online catalog. Users can be presented with GUIs 345 that enable the users to submit search queries 350 to the search engine 320, and GUIs 345 can present search results 380 corresponding to the search queries 350. Each of the search results 380 can correspond to an item 310 included in an online catalog associated with the electronic platform. Users 305 can utilize GUIs 345 to view the search results 380, select items 310 included in the search results 380 and, if desired, to add the items 310 to a digital shopping cart 385 and/or initiate purchasing of the items 310.

The electronic platform 330 can be configured to store historical data 390, which records activities involving users' 305 interactions with electronic platform 330 and/or items 310 offered through the electronic platform 330. In certain embodiments, the historical data 390 may record previous search queries 350 submitted via the electronic platform 330, as well as timestamps indicating when the search queries 350 were submitted and which users 305 submitted the search queries 350. The historical data 390 also may include user engagement metrics, which can include various data associated with tracking user interactions with search queries 350 and/or interactions with search results 380 and/or items 310 presented in response to the search queries 350.

The search engine 320 can be configured to predict and/or present various types of search queries 350 to users 305 including, but not limited to trending search queries 351, typeahead queries 352, and recent search queries 353. These predicted search queries 350 can be presented on GUIs 345, and users 305 can select queries that are applicable to desired items 310. While users 305 also can submit custom textual queries to the search engine 320, presenting the users 305 with the aforementioned search query predictions can improve user experiences on the electronic platform 330 and reduce the time spent by users in identifying relevant search results 380.

The typeahead queries 352 presented by the search engine 320 can correspond to candidate queries that are predicted by the search engine 320 based on text strings that are being entered by users 305. For example, as a user 305 enters each keystroke defining a search query 350, the search engine 320 can generate and present a listing of candidate search queries based on the textual string that has been entered thus far. Typically, the search engine 320 identifies the typeahead queries 352 by analyzing the popularity of previously submitted search queries over an extended time period (e.g., over the course of a previous year).

The recent search queries 353 presented by the search engine 320 can correspond to candidate queries that are predicted based on recent search histories of the users 305. For example, the recently searched queries 353 presented to a user 305 can include a listing of search queries 350 that were previously submitted by the user 305 in a recent time period (e.g., in the previous day or week).

While presenting users 305 with the typeahead queries 352 and recently searched queries 353 can be useful to predict future search queries 350 desired by users 305, these types of search queries 353 often fail to identify search queries that are popular or trending in the short-term (e.g., popular in a previous week or month). One common scenario where a search query 350 becomes popular in the short-term occurs when an item 310 (e.g., a product or service) is initially launched or initially becomes available for purchase. In other scenarios, search queries 350 can be become popular in the short-term based on seasonable factors and/or based on holidays that occur during a calendar year. For example, search queries for "notebooks" or "school supplies" can begin to trend each year when students are returning to school. Similarly, search queries for "Halloween decorations" can become popular each October. The predictive techniques utilized to present the typeahead queries 352 and recent searched queries 353 do not account for these short-term trends and, therefore, users are required to manually enter search queries if they wish to search for items 310 that are trending during these short-term periods.

To account for these and other drawbacks, the search engine 350 can be configured to identify, predict, and present one or more trending search queries 351 to users 305. As explained in further detail below, the search engine 350 can execute a trending analysis function performs a statistical of historical user engagement data to identify search queries that are trending in the short-term. This trending analysis function can be executed on a periodic basis (e.g., daily) to continuously update the trending queries 351 and capture fast-changing trends. In some scenarios, the trending analysis function is executed offline and the trending queries 351 identified using the function are uploaded to the search engine 320 on a periodic basis.

In some instances, when a user places a cursor in query field that receives textual search queries, the search engine 350 can display a listing of trending search queries 351 to the user before the user begins typing a search query 350 into the query field. If a desired query is presented in the listing of trending search queries 351, the user can easily select the desired trending search query 351 to rapidly initiate a search for corresponding items 351 that are trending in the short-term. Additional details are discussed below with respect to how the search engine 320 can identify and/or predict the trending search queries 351.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a search engine 320 and electronic platform 330. The one or more processing modules 402 can be configured to execute any and all instructions associated with implementing the functions performed by these components. Exemplary configurations for each of these components are described in further detail below.

Figure 6:
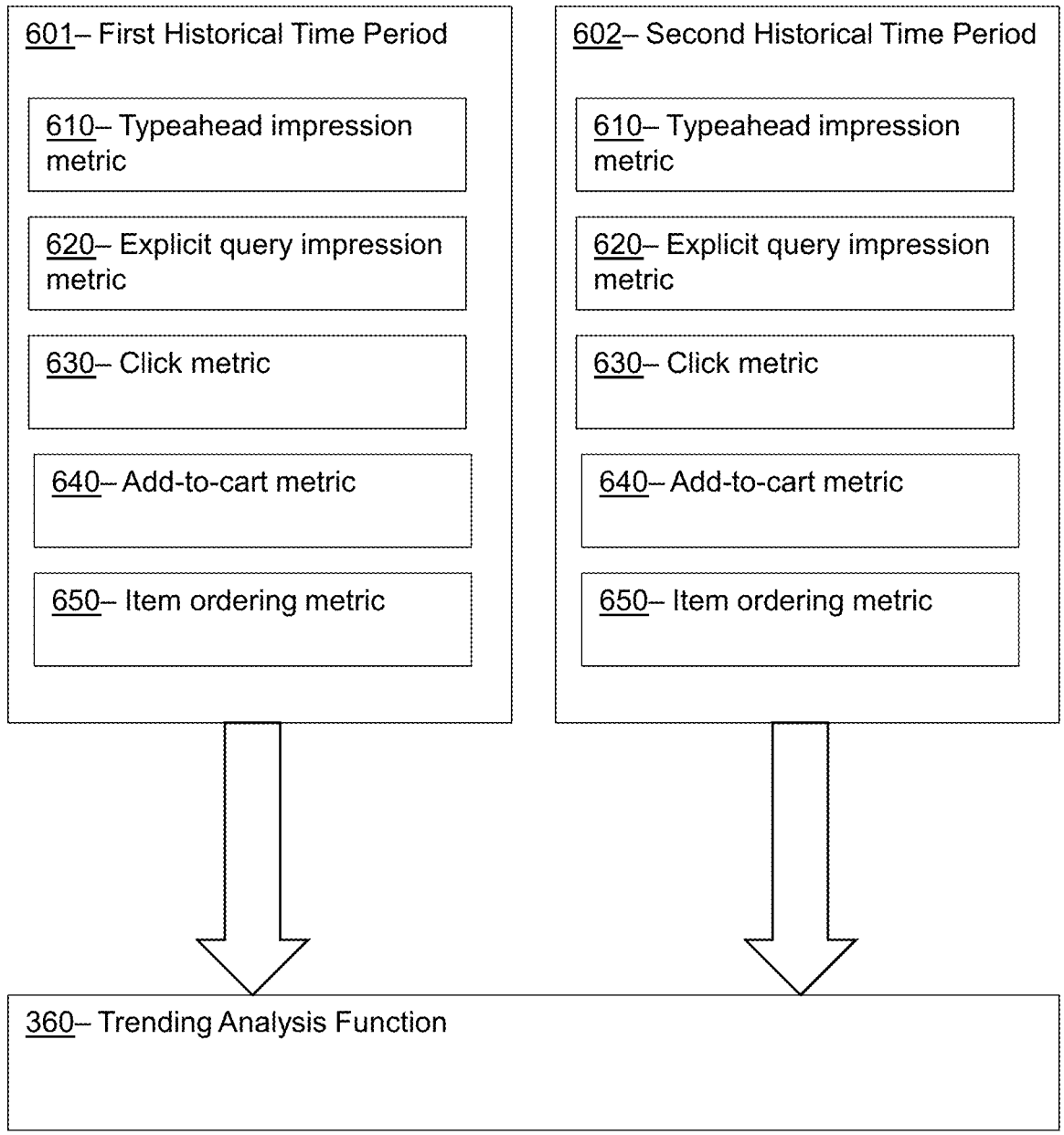
FIG. 6 illustrates a representative block diagram for user engagement metrics, according to an embodiment.

The electronic platform 350 includes one or more databases 410 that are configured to store the historical data 390 mentioned above. Amongst other things, the historical data 390 can include user engagement metrics 391, historical search queries 392, and item ordering metrics 650 (FIG. 6). While the user engagement metrics 391 and historical search queries 392 are illustrated in separate boxes of FIG. 4, it should be understood that the data encompassed by each is not necessarily exclusive of the others and, in some cases, there may be overlap.

The historical search queries 392 can include each search query 350 that was previously submitted by users 305 on the electronic platform 330. The historical search queries 392 can include both textual search queries that were manually input by the users 305 and predicted search queries (e.g., trending queries 351, typeahead queries 352, recently searched queries 353, etc.) that were presented by the search engine 320 and selected by the users 305. Each of the historical search queries 392 may be stored with timestamps, or other related data, which identifies a date and time when the search queries 350 were submitted.

The user engagement metrics 391 can generally include any data relating to users' interactions with search queries 350 and/or users' interactions with search results 380 and items 310 presented in response to search queries 350. For example, the user engagement metrics 391 can indicate how many times each historical search query 392 was entered by users 305 in a previous time period and/or how many times the historical search query 392 was presented to users as a typeahead query prediction during the previous time period. The user engagement metrics 391 an indicate how many times users 305 selected (e.g., clicked on or selected via a tap gesture) an item 310 presented in search results 380 that were displayed in response to submitted the historical search query 391. The user engagement metrics 391 also can indicate how many times users 305 added an item 310 to a digital shopping cart 185 (FIG. 3) and/or placed an order (e.g., purchased) for an item 310 after the historical search query 391 was submitted. The user engagement metrics 391 can capture a variety of other data points related to users' engagement with the historical search queries 392.

A trending analysis function 360 can be executed by the search engine 320 and/or electronic platform 330 to generate a listing of trending queries 351 based, at least in part, on an analysis of the user engagement metrics 391 derived from the historical data 390. In some cases, for each historical search query 392, the trending analysis function 360 can utilize user engagement metrics 391 that are gathered across two different historical time periods time periods to identify the trending queries 351. For example, for a given historical search query 392, the trending analysis function 360 can compare the user engagement metrics 391 generated for a first historical time period (e.g., a previous 7-day period) with the user engagement metrics 391 generated for a second historical time period (e.g., a previous month or previous 28-day period) to identify the trending queries 351. The types of user engagement metrics 391 that are analyzed by the trending analysis function 360 to identify the trending queries 351 can vary.

FIG. 6 is a block diagram illustrating exemplary user engagement metrics that can be utilized by the trending analysis function 360 to identify trending queries. These user engagement metrics can be determined for each of a plurality of historical search queries that were previously submitted to the search engine. For each historical search query, a first set of user engagement metrics can be extracted from the historical data for a first historical time period 601 (e.g., a previous week) and a second set of user engagement metrics can be extracted for a second historical time period 602 (e.g., a previous month or previous 28-day period). The user engagement metrics extracted for each of the historical periods (601, 602) can include the following:

(a) Typeahead impression metric 610: This metric indicates how many times the historical search query was presented as a typeahead query during the corresponding historical time period.

(b) Explicit query impression metric 620: This metric indicates how many times the historical search query was entered via a query input field (e.g., was typed or entered via textual inputs) during the corresponding historical time period.

(c) Click metric 630: This metric indicates how many times an item presented in search results was selected (e.g., clicked on or selected via a tap gesture) after the historical search query was submitted to the search engine during the corresponding historical time period.

(d) Add-to-cart (ATC) metric 640: This metric indicates how many times a search result item was added to an electronic shopping cart after the historical search query was submitted to the search engine during the corresponding historical time period.

(e) Item ordering metric 650: This metric indicates how many times an item presented in search results was ordered (e.g., purchased) after the historical search query was submitted to the search engine during the corresponding historical time period.

The above metrics are intended to provide examples of user engagement metrics that can be extracted from the historical data to determine whether a historical search query is trending. In some embodiments, one or more of the metrics may be excluded and/or may not be utilized. Additionally, in some embodiments, additional metrics not explicitly mentioned above also may be extracted from the historical data.

Returning to FIG. 4, the aforementioned user engagement metrics 391 can be extracted for each historical search query 392 for two separate historical time periods. The trending analysis function 630 can utilize these metrics to detect which historical search queries correspond to trending queries 351.

In certain embodiments, the trending analysis function 630 can utilize the user engagement metrics 391 to perform an initial filtering of the historical search queries 392, which excludes historical search queries 392 that are not statistically trending. In doing so, the trending analysis function 630 can compare corresponding user engagement metrics 391 from each of the two historical time periods to generate significance scores 362 (e.g., T-scores). For example, for each historical search query 392, a separate significance score 362 can be generated for each of the aforementioned user engagement metrics 391 including a typeahead impression metric 610 (FIG. 6), an explicit query impression metric 620 (FIG. 6), a click metric 630 (FIG. 6), an add-to-cart metric 640 (FIG. 6), and an item ordering metric 650 (FIG. 6). In this exemplary scenario, five separate significance scores 362 can be generated for each historical search query 392, each of which is based on a comparison of the user engagement metrics 391 from a first historical time period (e.g., a previous 7-day period) and a second historical time period (e.g., a previous 28-day period). However, as mentioned above, other user engagement metrics may be considered (or some of the aforementioned metrics may be omitted) and, therefore, the number of significance scores 362 generated for each historical search query 392 can vary.

In certain embodiments, the trending analysis function 630 can apply a T-test and/or other statistical comparison to corresponding metrics from the first and second historical time periods. For example, a T-test can be applied to compare a typeahead impression metric computed for a first historical time period with a typeahead impression metric computed for a second time period. Additionally, separate T-tests also can be applied to the other metrics mentioned above in a similar manner (i.e., T-tests can be applied to the explicit query impression metrics generated for the first and second historical time periods, the click metrics generated for the first and second historical time periods, the add-to-cart metrics generated for the first and second historical time periods, and the item ordering metrics generated for the first and second historical time periods). In this scenario, the T-scores generated for each of the metrics can represent the significance scores 362.

The significance scores 362 generated for the user engagement metrics 391 can generally indicate if a corresponding historical search query 392 is becoming more popular and/or is increasing in traffic on the electronic platform 330. Each significance score 362 provides a separate or independent measure of the popularity of the historical search query 392. Generally speaking, for each of the user engagement metrics 391, if the value computed for the more recent historical time period (e.g., the previous 7 day period) indicates a greater growth rate relative to the extended historical time period (e.g., the previous 28-day period), it means that the historical search query is increasing in popularity.

The significance scores 362 generated for a given historical search query 392 can be utilized, at least in part, to determine whether the historical search query 392 should be included in a set of trending queries 351. Prior to including historical search queries 392 in the set of trending queries 351, the significant scores 362 can be utilized to filter out or remove historical search queries 392 that have not achieved a threshold level of popularity. Additional filtering operations also can be applied to ensure all of the historical search queries 392 included in the trending search queries 351 are sufficiently trending in popularity. These filtering operations are described in further detail below.

A first filtering stage can be applied which compares the significance scores 362 generated for each historical search query 392 to a significance threshold 363. For a given historical search query 392, each of the significance scores 362 is compared to a significance threshold 363, which represents a pre-determined threshold level of popularity relative to a particular metric. In certain embodiments, the significance threshold 363 can be set at 2.056, which operates to exclude any historical search queries that have a T-score (or significance score 362) below this value from the set of trending queries 351. Other values also can be utilized for the significance threshold 363.

If all of the significance scores 362 for a given historical search query 392 satisfy or exceed the significance threshold 363, then the historical search query 392 is identified as a candidate for inclusion in the set of trending search queries 351 (subject to additional filtering stages discussed below). Conversely, if any of the significance scores 362 for the historical search query 392 fail to satisfy or fall below the significance threshold 363, then the historical search query 392 is excluded from the set of trending search queries 351.

A second filtering stage can be applied to each of the candidate historical search queries 392 that satisfied the first filtering stage. In this second filtering stage, an item engagement metric for each candidate query is evaluated to filter out historical search queries 392 that did not achieve a threshold level of user engagement during a predetermined time period. Various types of item engagement metrics can be used for this filtering. For example, this second filtering stage may exclude candidate queries that did not result in a threshold number of order placements, ATC events, click events, etc.

In certain embodiments, an item ordering metric 650 (FIG. 6) can be used to filter out candidate queries that did not result in a minimum number of orders being placed in a given time period. In the context of this second filtering stage, the item order metric may indicate how many times an item 310 presented in search results 380 was ordered after a historical search query 192 was submitted to the search engine 329 during a recent historical time period (e.g., such as in the previous 7 days). For each historical search query 392, the item ordering metric can be compared to an order placement threshold 364, which represents a minimum number of orders placed in the recent historical time period. In some cases, the order placement threshold may be set to 7, thereby excluding any candidate historical search query 392 that did not result in placement of seven orders during the recent historical time period. Other values (e.g., 5, 10, 20, etc.) also can be used for the order placement threshold 364. Additionally, other types of item engagement metrics (e.g., ATC metrics, click metrics, etc.) also can be utilized in this second filtering stage.

A third filtering stage can be applied to the candidate historical search queries 392 that pass the first and second filtering stages. In the third filtering stage, a human reviewer can review the candidate historical search queries 392 and manually exclude zero or more of the remaining historical search queries 392. For example, in some cases, a human reviewer may remove candidate queries that are offensive, embarrassing, and/or which conflict with business policies intended by a provider of the electronic platform 330. In some scenarios, a query review interface 370 may provide a GUI that enables a human reviewer to remove any unwanted or undesired candidate historical search queries 392 from the set of trending queries 351.

The remaining historical search queries 392 that satisfy the first, second and third filtering stages can be identified as trending search queries 351. The trending search queries 351 can then be presented on one or more GUIs to users that access the electronic platform 330.

In certain embodiments, the rank or order in which the trending search queries 351 are presented on the one or more GUIs to users can be based on query trending scores 361 that are computed for each of the trending search queries 351. In general, a query trending score 361 for a trending search query 351 may represent a value that represents an overall popularity indicator for the trending search query 351. When presenting to users, the trending search queries 351 can be ranked or ordered based on their corresponding query trending scores 362 (e.g., ranked or ordered from highest to lowest). This ranking or ordering can present the trending queries 351 to users in an order of most popular to least popular.

In certain embodiments, each query trending score 361 may be determined by initially generating metric trending scores 365 for each of the user engagement metrics 391, and then combining the metric trending scores 365 to derive the query trending score 361. More specifically, for each historical search query 392, a plurality of metric trending scores 365 can be generated based on the user engagement metrics 392 (e.g., the typeahead impression, explicit query impression, click, ATC, and order metrics) described above. Each metric trending score 365 can be generated using the user engagement metrics extracted from the two separate time periods described above, and each may indicate a popularity of a corresponding historical search query 392 based on a particular metric. The metric trending scores 365 can then be combined to generate the query trending score 361 for the corresponding historical search query 392.

The following discussion provides additional details regarding how the above-described functions can be executed by the trending analysis function 360 to determine whether or not a given historical search query 392 corresponds to a trending search query 351. In evaluating a given historical search query 392, a plurality of user engagement metrics 391 corresponding to this query may initially be extracted from the historical 390.

For example, the user engagement metrics 351 computed for the historical search query 392 can include user engagement metrics 351 separately computed for both a first historical time period (e.g., a 7-day period) and a second historical time period (e.g., a 28-day period). The user engagement metrics 351 can include the following metric pairs: 1) a first typeahead impression metric (ta_impression7) for the first historical time period and a second typeahead impression metric (ta_impression28) for the second historical time period; 2) a first explicit query impression metric (impression7) for the first historical time period and a second explicit query impression metric (impression28) for the second historical time period; 3) a first click metric (click7) for the first historical time period and a second click metric (click28) for the second historical time period; 4)) a first add-to-cart metric (atc7) for the first historical time period and a second add-to-cart metric (atc28) for the second historical time period; and 5) a first item ordering metric (order7) for the first historical time period and a second item ordering metric (order28) for the second historical time period.

The trending analysis function 630 can compute the aforementioned metrics by aggregating related values in the historical data 390 corresponding to impressions, clicks, ATC actions, and order initiation actions. For example, the values for the typeahead impression metrics 610 (FIG. 6) in the first and second historical time periods can be computed as follows:

$$\text{ta\_impression}_7 = \sum_{i=0}^{27} \exp(-0.99 \cdot i) \cdot \text{ta\_impressions}_i$$

$$\text{ta\_impressions}_{28} = \sum_{i=0}^{27} \exp(-0.023 \cdot i) \cdot \text{ta\_impressions}_i$$

In this example, ta_impression$_7$ represents the weighted sum of the typeahead impressions collected over a 7-day historical time period, and ta_impression$_{28}$ represents the sum of the typeahead impressions collected over a 28-day historical time period. The other user engagement metrics can be generated in similar fashion by aggregating the values corresponding to impressions, clicks, ATC actions, and order initiation actions in both of the historical time periods.

Additionally, the trending analysis function 630 can compute metric trending scores 365 for each of the metric pairs mentioned above using the extracted user engagement metrics 391. For example, the metric trending score 365 for the pair of typeahead impression metrics can be computed as follows:

$$\text{ts\_ta\_impression} = \tanh\left(\log \frac{\text{ta\_impression}_7 + 0.1}{\text{ta\_impression}_{28} - \text{ta\_impression}_7 + 0.1}\right)$$

The same or similar function can be used to compute the metric trending scores 365 for the other metric pairs metric pairs mentioned above. Thus, in this example, five metric trending scores 365 are computed for the following parameters: ta_impression, impression, click, add-to-cart and order.

After the metric trending scores 365 are computed for each type of user engagement, these values can be combined into a query trending score 361 for the historical search query. Various techniques can be used to combine the metric trending scores 365. One exemplary technique can use a linear combination as follows:

$$ts = \text{ts\_ta\_impression} + 4 \times \text{ts\_impression} + \text{ts\_clicks} + \text{ts\_atc} + \text{ts\_order}$$

It should be recognized that other techniques can be utilized to combine the metric trending scores 365 and/or to generate the query trending score 361.

However, because some queries are not trending in a statistically significant manner, a separate T-test can be applied to each type of user engagement metric to filter out the non-significant trending queries as follows:

$$t^{(e)} = \frac{\bar{X}_7^{(e)} - \bar{X}_{21}^{(e)}}{S_p\sqrt{\frac{1}{N_7} + \frac{1}{N_{21}}}}$$

where $$s_p^{(e)} = \sqrt{\frac{(N_7 - 1)s_{X_7^{(e)}}^2 + (N_{21} - 1)s_{X_{21}^{(e)}}^2}{N_7 + N_{21} - 2}};$$

$$N_7 = 7, N_{21} = 21;$$

$\bar{X}_7^{(e)}$: mean number of united with engagement type e by this query within n days; and $x_{X_7^{(e)}}^2$: standard deviation of number of units with engagement type e by this query within n days.

Based on the results of the T-tests, the historical search query may be selected as a candidate for inclusion in the trending queries 351 if each t-score>2.056, which indicates the historical search query is trending in a statistically significant manner. Conversely, the historical search query may be excluded from the trending queries 351 if one or more of the t-scores (significant scores 362) fail to satisfy this threshold (see additional details on first filtering stage above). To further reduce sensitivity to random trending queries, a minimum total number of orders placed within 7 days may be imposed (see additional details on second filtering stage above).

The above-described process may be repeated for each of the historical search queries 392 to identify a set of trending search queries 351. When users access the electronic platform 330, the trending search queries 351 can be displayed on various interfaces or GUIs. In some cases, the query trending scores 361 mentioned above (ts) can be utilized to rank and order the trending search queries 351 on the interfaces or GUIs.

FIG. 5 illustrates an exemplary search engine interface 500 for displaying trending search queries 351. The search engine interface 500 includes a query input field 510 that enables users to submit search queries 350 (e.g., text-based search queries) to the search engine 320 (FIGS. 3-4). When a user places a cursor in the query input field 510 (or otherwise selects the query input field 510), the search engine interface 500 may automatically be updated to display a window 540.

The window 540 may display one or more predicted queries 520, such as one or more typeahead queries 352 (FIGS. 3-4) or one or more recent search queries 353 (FIGS. 3-4). The window 540 also can include a trending section 530 that displays one or more trending searching queries 351. The trending search queries 351 displayed in the trending section 530 may be identified utilizing the techniques described throughout this disclosure. Additionally, the trending search queries 351 may be ranked or ordered based on their corresponding trending scores 361 (FIG. 4), such that the most popular trending search queries 351 appear before less popular trending search queries 351.

Selection of a trending search query 351 will initiate a search of an online catalog by the search engine. Search results 380 identified using the trending search query 351 can be displayed on an interface to the user.

In some embodiments, the trending queries 351 and predicted queries 520 can be presented on the search engine interface 500 in an intuitive and user-friendly manner that improves experiences of users and reduces the times required to specify desired queries. Specifically, in response to a user placing a cursor in the query input field 510 (or otherwise selecting the query input field 510), the window 540 may initially display trending search queries 531 (e.g., in the trending section 530) along with one or more recent search queries 533. After the user begins typing a query into the query input field 510, the recent search queries 353 (and, in some cases, the trending search queries 351) can be removed from the window 540 and replaced with typeahead queries 352.

This technique of updating the search engine interface 500 with various query predictions is intuitive because it displays the trending search queries 351 and recent search queries 353 at a point in time when the the search engine 520 has no knowledge of what the user desires (before the user begins typing a query into the query search interface). Once the user begins typing the query, the window 540 can be updated to display more accurate predictions based on typeahead prediction technologies. Thus, at all times during the user's search experience, the user is presented with the best possible predicted search queries.

Figure 7:
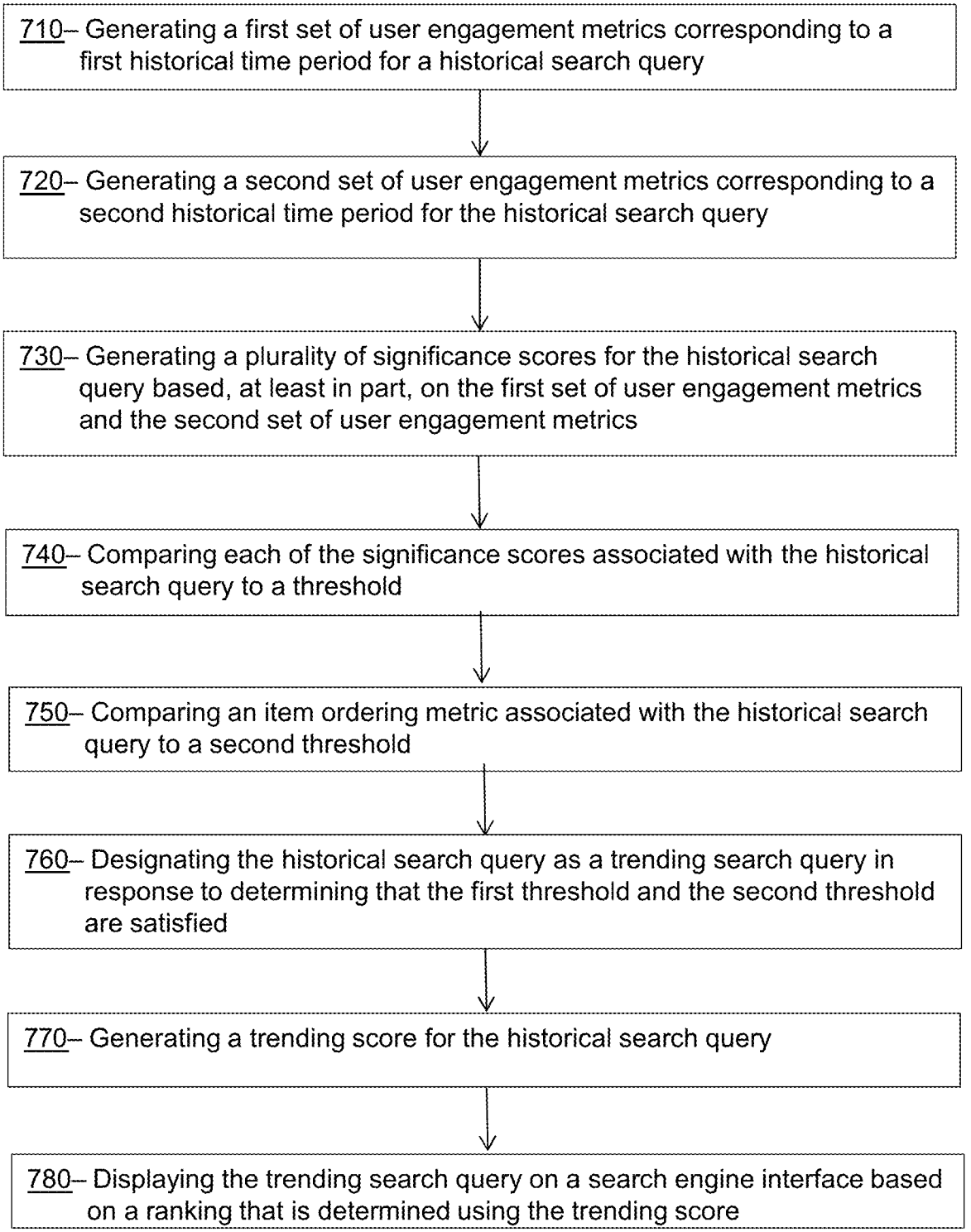
FIG. 7 illustrates a flowchart for a method, according to an embodiments.

FIG. 7 illustrates a flow chart for a method 700 for identifying trending search queries, according to an embodiment. Method 700 is merely exemplary and is not limited to the embodiments presented herein. Method 700 can be employed in many different embodiments or examples not specifically depicted or described herein. In some embodiments, the steps of method 700 can be performed in the order presented. In other embodiments, the steps of method 700 can be performed in any suitable order. In still other embodiments, one or more of the steps of method 700 can be combined or skipped. In many embodiments, system 300 (FIG. 3) can be suitable to perform method 700 and/or one or more of the steps of method 700. In these or other embodiments, one or more of the steps of method 700 can be implemented as one or more computer instructions configured to run at one or more processing modules and configured to be stored at one or more non-transitory memory storage modules. Such non-transitory memory storage modules can be part of a computer system such as system 300 (FIGS. 3-4), web server 310 (FIG. 3), search engine 320 (FIGS. 3-4), and/or electronic platform 330 (FIGS. 3-4). The processing module(s) can be similar or identical to the processing module(s) described above with respect to computer system 100 (FIG. 1).

In step 710, a first set of user engagement metrics corresponding to a first historical time period are generated for a historical search query.

In step 720, a second set of user engagement metrics corresponding to second historical time period are generated for the historical search query.

In step 730, a plurality of significance scores are generated for the historical search query based, at least in part, on the first set of user engagement metrics and the second set of user engagement metrics.

In step 740, each of the significance scores associated with the historical search query is compared to a threshold.

In step 750, an item ordering metric associated with the historical search query is compared to a second threshold.

In step 760, the historical search query is designated as a trending search query in response to determining that the first threshold and the second threshold are satisfied. In this manner, the significance scores and ordering metric can filter out queries that are not trending significantly. In some embodiments, an additional filtering stage also can be performed by a human reviewer as described above.

In step 770, a trending score for the historical search query is generated.

In step 780, the trending search query is displayed on a search engine interface based on a ranking that is determined using the trending score.

As evidenced by the disclosure herein, the inventive techniques set forth in this disclosure are rooted in computer technologies that overcome existing problems in known search engines, including problems dealing with predicting or identifying search queries that are trending in the short-term. The techniques described in this disclosure provide a technical solution (e.g., one that involves monitoring user engagement metrics and executing statistical-based analysis techniques) for overcoming the limitations associated with known techniques. This technology-based solution marks an improvement over existing capabilities and functionalities related to generating trending queries by identifying the trending queries using techniques that are highly accurate and based on objective statistical approaches.

In many embodiments, the techniques described herein can be implemented in a practical application that provides several technological improvements related to leveraging historical data to detect or predict trending search queries. The techniques described herein can provide a significant improvement over conventional approaches for predicting search queries desired by user, such as approaches that are based on typeahead prediction technologies. In certain embodiments, the techniques described herein can beneficially make determinations based on dynamic information that describes current conditions relating to the popularity of various search queries.

In a number of embodiments, the techniques described herein can advantageously improve user experiences by predicting search queries that are desired by users based on analysis of short-term terms In various embodiments, the techniques described herein can executed on a periodic basis to continually update the accurate of these predictions.

In many embodiments, the techniques described herein can be used continuously at a scale that cannot be reasonably performed using manual techniques or the human mind. For example, the analytic techniques described herein can be utilized to analyze thousands or millions of historical search queries and to derive user engagement metrics corresponding to each of the queries.

In a number of embodiments, the techniques described herein can solve a technical problem that arises only within the realm of computer networks, as search engines do not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 7 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
one or more processors; and
one or more non-transitory computer-readable storage devices storing computing instructions that, when run on the one or more processors, cause the one or more processors to:
receive historical search queries submitted via a search engine on an electronic platform;
generate a first set of user engagement metrics corresponding to a first historical time period for a historical search query of the historical search queries, wherein the first set of user engagement metrics includes three or more of:
a first typeahead impression metric indicating how many times the historical search query was presented as a typeahead query during the first historical time period,
a first explicit query impression metric indicating how many times the historical search query was entered via a query input field during the first historical time period,
a first click metric indicating how many times an item was selected after the historical search query was submitted during the first historical time period and after the item was presented in search results from the historical search query,
a first add-to-cart metric indicating how many times the item was added to an electronic shopping cart after the historical search query was submitted during the first historical time period and after the item was presented in search results from the historical search query, or
a first order metric indicating how many times the item was ordered after the historical search query was submitted during the first historical time period and after the item was presented in search results from the historical search query;
generate a second set of user engagement metrics corresponding to a second historical time period for the historical search query,
wherein the first historical time period is shorter than the second historical time period, and wherein the second set of user engagement metrics includes three or more of:
a second typeahead impression metric indicating how many times the historical search query was presented as a typeahead query during the second historical time period,
a second explicit query impression metric indicating how many times the historical search query was entered via a query input field during the second historical time period,
a second click metric indicating how many times an item was selected after the historical search query was submitted during the second historical time period and after the item was presented in search results from the historical search query,
a second add-to-cart metric indicating how many times the item was added to an electronic shopping cart after the historical search query was submitted during the second historical time period and after the item was presented in search results from the historical search query, or
a second order metric indicating how many times the item was ordered after the historical search query was submitted during the second historical time period and after the item was presented in search results from the historical search query;
generate significance scores for the historical search query based, at least in part, on the first set of user engagement metrics and the second set of user engagement metrics;
compare each of the significance scores associated with the historical search query to a threshold;
include the historical search query in trending search queries, within the historical search queries, based, at least in part, on each of the significance scores associated with the historical search query satisfying the threshold; and
generate a search engine interface, for the search engine, that displays the trending search queries to a user before the user types a search query into a query input field of the search engine interface.

2. The system of claim 1, wherein:
a query trending score is generated for the historical search query; and
the query trending score is utilized to determine a ranking or ordering of the historical search query when the historical search query is displayed on the search engine interface.

3. The system of claim 2, wherein:
metric significance scores are generated based on the first set of user engagement metrics and the second set of user engagement metrics;
each of the metric significance scores measures a popularity of the historical search query according to a separate user engagement metric; and
the query trending score is generated, at least in part, by combining the metric significance scores.

4. The system of claim 1, wherein:
prior to including the historical search query in the trending search queries, an item ordering metric associated with the historical search query is compared to a second threshold; and
the historical search query is included in the trending search queries based, at least in part, on a second determination that the item ordering metric satisfies the second threshold.

5. The system of claim 1, wherein the first set of user engagement metrics includes:
the first typeahead impression metric; and
one or more of:
the first explicit query impression metric;
the first click metric;
the first add-to-cart metric, or
the first order metric.

6. The system of claim 1, wherein the significance scores for the historical search query include one or more of:
a first significance score based on an analysis of the first typeahead impression metric and the second typeahead impression metric;
a second significance score based on an analysis of the first explicit query impression metric and the second explicit query impression metric;
a third significance score based on an analysis of the first click metric and the second click metric;
a fourth significance score based on an analysis of the first add-to-cart metric and the second add-to-cart metric; or
a fifth significance score based on an analysis of the first order metric and the second order metric.

7. The system of claim 6, wherein the first significance score, the second significance score, the third significance score, the fourth significance score, and the fifth significance score are weighted differently based on an analysis of the first set of user engagement metrics corresponding to the first historical time period and the second set of user engagement metrics corresponding to the second historical time period.

8. The system of claim 1, wherein:
the trending search queries are displayed on the search engine interface in response to the query input field being selected.

9. The system of claim 8, wherein:
in response to receiving a textual input via the query input field, the search engine interface is updated to remove the trending search queries from the search engine interface, and one or more typeahead queries are displayed on the search engine interface.

10. The system of claim 1, wherein:
prior to displaying the trending search queries on the search engine interface, the trending search queries are provided to a human reviewer for filtering the trending search queries.

11. A method implemented via execution of computing instructions by one or more processors and stored on one or more non-transitory computer-readable storage devices, the method comprising:
receiving historical search queries submitted via a search engine on an electronic platform;
generating a first set of user engagement metrics corresponding to a first historical time period for a historical search query of the historical search queries,
wherein the first set of user engagement metrics includes three or more of:
a first typeahead impression metric indicating how many times the historical search query was presented as a typeahead query during the first historical time period,
a first explicit query impression metric indicating how many times the historical search query was entered via a query input field during the first historical time period,
a first click metric indicating how many times an item was selected after the historical search query was submitted during the first historical time period and after the item was presented in search results from the historical search query,
a first add-to-cart metric indicating how many times the item was added to an electronic shopping cart after the historical search query was submitted during the first historical time period and after the item was presented in search results from the historical search query, or
a first order metric indicating how many times the item was ordered after the historical search query was submitted during the first historical time period and after the item was presented in search results from the historical search query;
generating a second set of user engagement metrics corresponding to second historical time period for the historical search query,
wherein the second set of user engagement metrics includes three or more of:
a second typeahead impression metric indicating how many times the historical search query was presented as a typeahead query during the second historical time period,
a second explicit query impression metric indicating how many times the historical search query was entered via a query input field during the second historical time period,
a second click metric indicating how many times an item was selected after the historical search query was submitted during the second historical time period and after the item was presented in search results from the historical search query,
a second add-to-cart metric indicating how many times the item was added to an electronic shopping cart after the historical search query was submitted during the second historical time period and after the item was presented in search results from the historical search query, or
a second order metric indicating how many times the item was ordered after the historical search query was submitted during the second historical time period and after the item was presented in search results from the historical search query;

generating significance scores for the historical search query based, at least in part, on the first set of user engagement metrics and the second set of user engagement metrics;

comparing one or more of the significance scores associated with the historical search query to a threshold;

including the historical search query in trending search queries based, at least in part, on each of the one more of the significance scores associated with the historical search query satisfying the threshold; and generating a search engine interface for the search engine that displays the trending search queries.

12. The method of claim 11, wherein:
a query trending score is generated for the historical search query included in the trending search queries; and
the query trending score is utilized to determine a ranking or ordering of the historical search query when the historical search query is displayed on the search engine interface.

13. The method of claim 12, wherein:
metric significance scores are generated based on the first set of user engagement metrics and the second set of user engagement metrics;
each of the metric significance scores measures a popularity of the historical search query according to a separate user engagement metric; and
the query trending score is generated, at least in part, by combining the metric significance scores.

14. The method of claim 11, wherein:
prior to including the historical search query in the trending search queries, an item ordering metric associated with the historical search query is compared to a second threshold; and
the historical search query is included in the trending search queries based, at least in part, on a second determination that the item ordering metric satisfies the second threshold.

15. The method of claim 11, wherein:
the first set of user engagement metrics includes:
the first typeahead impression metric;
the first explicit query impression metric;
the first click metric;
the first add-to-cart metric; and
the first order metric.

16. The method of claim 11, wherein generating the significance scores for the historical search query includes two or more of:
generating a first significance score based on an analysis of the first typeahead impression metric and the second typeahead impression metric;
generating a second significance score based on an analysis of the first explicit query impression metric and the second explicit query impression metric;
generating a third significance score based on an analysis of the first click metric and the second click metric;
generating a fourth significance score based on an analysis of the first add-to-cart metric and the second add-to-cart metric; or
generating a fifth significance score based on an analysis of the first order metric and the second order metric.

17. The method of claim 16, wherein the first significance score, the second significance score, the third significance score, the fourth significance score, and the fifth significance score are weighted differently based on an analysis of the first set of user engagement metrics corresponding to the first historical time period and the second set of user engagement metrics corresponding to the second historical time period.

18. The method of claim 11, wherein:
the trending search queries are displayed on the search engine interface in response to the query input field being selected; and
prior to displaying the trending search queries on the search engine interface, the trending search queries are provided to a human reviewer for filtering the trending search queries.

19. The method of claim 18, wherein:
in response to receiving a textual input via the query input field, the search engine interface is updated to remove the trending search queries from the search engine interface, and one or more typeahead queries are displayed on the search engine interface.

20. A non-transitory computer-readable medium storing instructions, wherein the instructions, upon execution by a processor, cause the processor to perform operations comprising:
receiving historical search queries submitted via a search engine on an electronic platform;
identifying trending search queries within the historical search queries, wherein identifying the trending search queries includes executing a trending analysis function on each of a historical search query that comprises:
generating a first set of user engagement metrics corresponding to a first historical time period for the historical search query,
wherein the first set of user engagement metrics includes three or more first metrics that include:
a first typeahead impression metric indicating how many times the historical search query was presented as a typeahead query during the first historical time period,
a first explicit query impression metric indicating how many times the historical search query was entered via a query input field during the first historical time period,
a first click metric indicating how many times an item was selected after the historical search query was submitted during the first historical time period and after the item was presented in search results from the historical search query,
a first add-to-cart metric indicating how many times the item was added to an electronic shopping cart after the historical search query was submitted during the first historical time period and after the item was presented in search results from the historical search query, or
a first order metric indicating how many times the item was ordered after the historical search query was submitted during the first historical time period and after the item was presented in search results from the historical search query;
generating a second set of user engagement metrics corresponding to a second historical time period for the historical search query,
wherein the second set of user engagement metrics includes three or more second metrics that include:
a second typeahead impression metric indicating how many times the historical search query was presented as a typeahead query during the second historical time period,
a second explicit query impression metric indicating how many times the historical search query was entered via a query input field during the second historical time period,
a second click metric indicating how many times an item was selected after the historical search query was submitted during the second historical time period and after the item was presented in search results from the historical search query, a second add-to-cart metric indicating how many times the item was added to an electronic shopping cart after the historical search query was submitted during the second historical time period and after the item was presented in search results from the historical search query, or a second order metric indicating how many times the item was ordered after the historical search query was submitted during the second historical time period and after the item was presented in search results from the historical search query;

generating significance scores for the historical search query based, at least in part, on the first set of user engagement metrics and the second set of user engagement metrics;

comparing each of the significance scores associated with the historical search query to a threshold;

including the historical search query in the trending search queries based, at least in part, on a determination that each of the significance scores associated with the historical search query satisfy the threshold; and generating a search engine interface for the search engine that displays the trending search queries.

* * * * *